United States Patent

[11] 3,602,010

[72] Inventor Eugene W. Hines
 Saline, Mich.
[21] Appl. No. 820,248
[22] Filed Apr. 29, 1969
[45] Patented Aug. 31, 1971
[73] Assignee New Hudson Corporation
 New Hudson, Mich.

[54] SHAFT COUPLING MEANS FOR HIGH TEMPERATURE ROLLS AND THE LIKE
 8 Claims, 3 Drawing Figs.
[52] U.S. Cl. .................................................. 64/15 C
[51] Int. Cl. ................................................... F16c 3/52
[50] Field of Search ...................................... 64/15 C,
 15, 27; 263/6 C; 308/20

[56] References Cited
UNITED STATES PATENTS
2,564,041  8/1951  Vogel ............................ 287/99
2,907,189  10/1959  Flieg ............................. 64/15 C
3,030,783  4/1962  Schmidt ........................ 64/15 C Primary Examiner—Mark M. Newman
Assistant Examiner—Randall Heald
Attorney—Harness, Dickey & Pierce ABSTRACT: There is herein disclosed shaft coupling means comprising a coiled spring means mounted in gripping engagement with and circumjacent spaced cylindrical end portions with a coil retainer means associated with a central portion of the coiled spring means.

PATENTED AUG 31 1971 3,602,010

INVENTOR.
Eugene W. Hines
BY
Harness, Dickey & Pierce
ATTORNEYS.

SHAFT COUPLING MEANS FOR HIGH TEMPERATURE ROLLS AND THE LIKE

BACKGROUND OF THE INVENTION

This invention relates generally to shaft coupling means and, in particular, to shaft coupling means for connecting an elongated high temperature ceramic roll to steel end journals. High temperature ceramic rolls are conveniently slip cast hollow tubes of substantial length (e.g. 5 to 10 feet) and having varying degrees of eccentricity. The end journals are conventionally made from high temperature alloy steel. In use, a number of the ceramic rolls form part of a conveyor and are rotatably supported within a high temperature (e.g. 3,500° F.) furnace by journal bearings located closely outside the furnace in a relatively lower temperature environment (e.g. 500° F.) Prior to this invention, there has been considerable difficulty in obtaining a satisfactory connection between the roll and the end journals.

SUMMARY OF THE INVENTION

This invention provides shaft coupling means having particular utility in connecting a high temperature ceramic roll to its end journal in a manner as to compensate for the eccentricity of the roll and to maintain a tight connection regardless of substantial temperature variations. The shaft coupling means comprises a tightly coiled spring means mounted in gripping relationship circumjacent generally axially aligned and axially spaced cylindrical end portions of the end journal and the roll. A central portion of the spring means, extending over a gap between the axially spaced end portions as rigidified as by welding of adjacent coils by a surrounding sleeve to limit transverse lateral displacement circumjacent the gap.

DETAILED DESCRIPTION OF THE INVENTION

Figure 1:
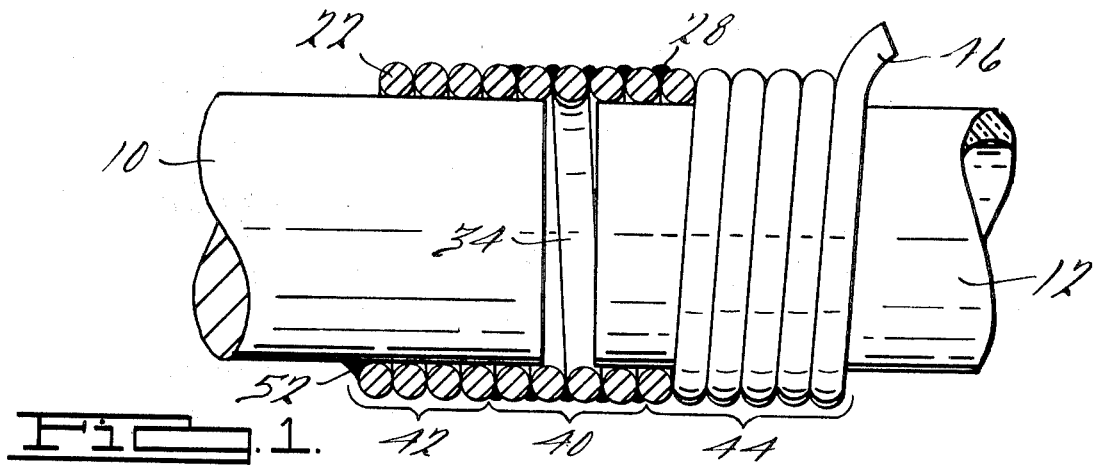
FIG. 1 is a side elevational view, partly in section, of one form of the present invention.

Referring now to the drawings, various types of shaft end portions 10–12, 14–16, 18–20, are shown to be held in general coaxial relationship by circumjacent coiled spring coupling means 22, 24, 26, whose coils are tightly wound in side by side relationship from a high temperature stainless steel alloy in the preferred embodiment. Central portions of the coiled spring means are rigidified to withstand shear loads and control lateral transverse displacement of the coils by antideflection coil retainer means 28, 30, 32 which may take various forms such as weldments 28 or metal sleeves 30, 32. The shaft end portions are axially spaced by gaps 34, 36, 38 of sufficient width to permit and compensate for a degree of axial misalignment therebetween.

The coiled spring means are formed so that shaft engaging surfaces are undersize relative to the adjacent shaft surface and have a gripping interference fit therewith. Thus, the coiled spring means 22, 24 are formed with an inside coil diameter smaller than the outside diameter of the shaft end portions 10–12 and 14–16 whereas coiled spring means 26 is formed with an outside diameter larger than the inside diameter of shaft end portions 18–20. The degree of gripping interference between the shaft end portions may be varied. For example, it may be desirable to more tightly grip the end journals 14, 18 than the roll ends 16, 20 by making the end journals slightly larger than the roll ends.

In the presently preferred form of the invention, shown in FIG. 1, central portion coils 40 have a larger inside diameter than adjacent end portions coils 42, 44 and a larger inside diameter than the outside diameter of the shaft end portions. The ends 46, 48, 50 of the spring means are extended to provide means to expand (or contract) the coils of the spring means to permit insertion and removal of an assembly mandrel and of the shaft end portions. In the assembled position, the end portion coils 42, 44 are held in expanded spring gripping relationship with the shaft end portions. For example in the form of FIG. 1, with a roll having an outside diameter of approximately 2 inches the formed inside diameter of the spring means is approximately 0.125 smaller than the outside diameter of the roll. However, the central portion coils 40 are held in a further expanded nongripping position by weldments 28 and have an inside diameter slightly larger (e.g. 0.005 to 0.015) than the outside diameter of the shaft end portions.

An illustrative assembly of the preferred form of FIG. 1 comprises: (1) expanding and temporarily holding the central portion coils 40 in an expanded position, as by a mandrel, providing an inside diameter greater than the outside diameter of the shaft end portion, (2) welding together and permanently holding the expanded central portion coils 40 in a position providing an inside diameter slightly greater than the outside diameter of the shaft end portions, (3) removing the mandrel and inserting the shaft end portions by unwinding end portion coils 42, 44 to temporarily expand the coils and increase the inside diameter beyond the outside diameter of the shaft end portions. (4) positioning the shaft end portions in axially spaced relationship, (5) releasing the end portion coils 42, 44 to clampingly engage and grip the shaft end portions, (6) welding at least one end coil to the associated shaft end portion, as indicated at 52, 54, to axially fix the coiled spring means relative to one of the shaft end portions.

In the preferred form of the invention the weldments 28 are formed in longitudinal rows of narrow circumferential width. The rows may be spaced circumferentially 120° (3 rows) or 90° (4 rows). The weldments are small size so as to merely "stitch" the adjacent coils to one another. In the preferred form of the invention, the coiled spring means is also stitch (spot) welded to roll end journal 14 and removably mounted on the roll end 16 to enable the roll to be disassociated from the roll end journal by expansion of the end portion coils 44. It is to be understood that FIGS. 2 and 3 show illustrative rolls and roll end journals, and that there is a roll end journal at both ends of the rolls 16, 20.

In another form of the invention the center coils 40 are restricted by sleeve elements 30, 32 to prevent expansion under transverse shear loads. In this form, the center coils are not welded together but are free to flex slightly within the sleeve element which may be welded at the ends to the circumjacent coils as at 56, 58. In the presently preferred embodiments, approximately one-half of the coils are restricted by the sleeve or by welding and approximately one-half of the coils are restricted by the sleeve or by welding and approximately one-fourth of the coils grippingly engage each of the shaft end portions without restriction.

It is contemplated that the illustrative forms of the inventive concepts may be variously applied. For example, in FIG. 3, the shaft coupling spring means is mounted inside a hollow ceramic roll 20 and a hollow roll end journal 18. In this example, the normal formed outside diameter of the coiled spring coupling means is larger than the inside diameters of the roll 20 and end journal 18. The spring coupling means is inserted by reducing its outside diameter by winding (contraction) and held in place by expansive forces when released. It is further contemplated that various other combinations of the inventive concepts may be utilized. For example, the sleeve 32 in FIG. 3 may be replaced by the weldments 28 of FIG. 1. Also, the inside mounting of FIG. 3 may be combined with the outside mountings of FIGS. 1 and 2, and one end of the coiled spring coupling means may be mounted inside a shaft end while the other end is mounted outside another shaft end. Further alternative embodiments contemplated at this time include coiled spring coupling means having a solid tubular center portion and integral coiled end portions.

Figure 2:
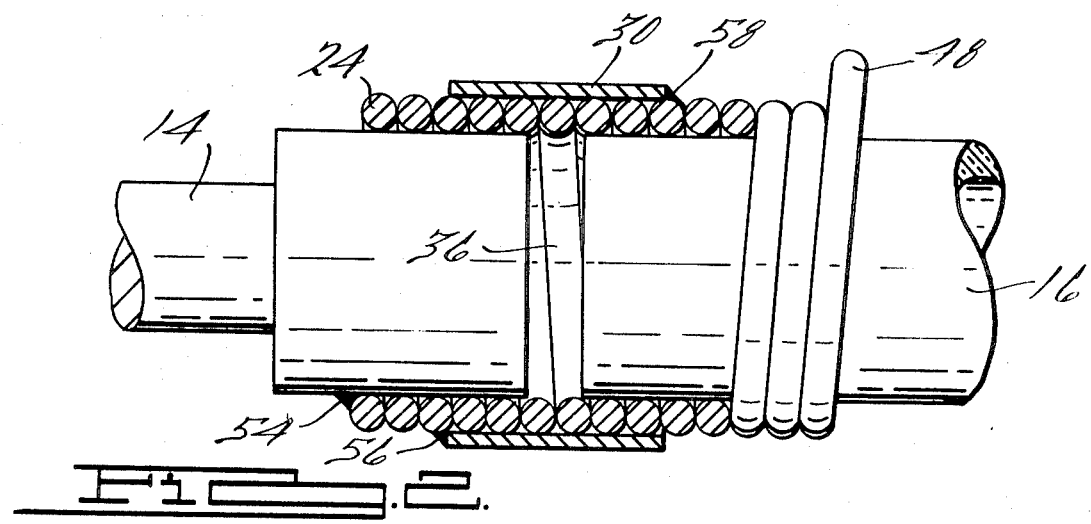
FIG. 2 is a side elevational view, partly in section of another form of the present invention.
Figure 3:
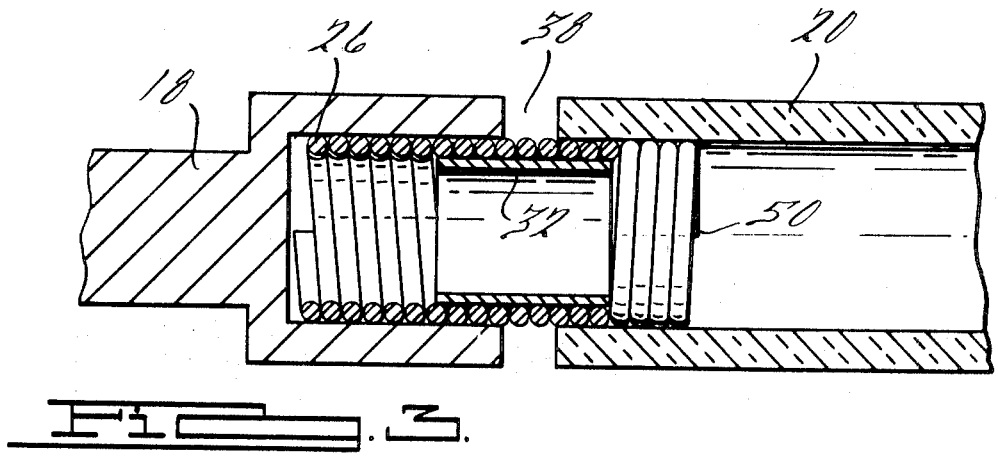
FIG. 3 is a side elevational view, partly in section, of still another form of the present invention.

The present invention is particularly adapted for use in connection with elongated tubular rolls and roll end journals, as particularly illustrated in FIGS. 2 and 3, which are utilized in high temperature furnaces. The invention provides a self-aligning coupling which is particularly advantageous in connecting relatively long out-of-round rolls to relatively short rigid end journals. It is contemplated that roll bearing life will be substantially increased by use of these coupling concepts. Furthermore, the great amounts of time previously spent in obtaining a satisfactory degree of alignment will be substantially reduced. The coupling is relatively easy to assemble and permits subsequent separation of the shafts while maintaining its self-aligning features and providing a strong, reliable, and durable coupling. Among other advantages are that the coupling permits connection of shafts of diverse materials having diverse heat transfer characteristics and coefficients of expansion. The coupling is not adversely affected by high temperatures and substantial temperature differentials (e.g. 3,500° F. to 500° F).

The invention claimed is:

1. In combination in a furnace roll end journal assembly for use in a high temperature environment and subject to substantial temperature differentials comprising:
   an elongated tubular roll of ceramiclike material having a relatively low coefficient of expansion and adapted to be mounted in the high temperature environment,
   an end journal of high temperature steel alloy material having a relatively high coefficient of expansion and adapted to be mounted in the high temperature environment,
   said end journal and said roll having generally axially aligned end portions positioned closely adjacent one another,
   a gap separating said end portions and permitting relative movement therebetween,
   coiled metallic spring means mounted in fixed gripping relationship circumjacent said end portions and holding the end portions in general axial alignment while permitting limited relative movement and axial deflection therebetween and compensating for variations in coefficients of expansion therebetween,
   at least substantial portions of said spring means being radially unrestricted except for the fixed gripping relationship with said end portions, and
   antideflection means associated with a central portion of said coiled spring means circumjacent the end portions and said transverse gap.

2. The invention as defined in claim 1 said antideflection means comprising weldments between adjacent coils of said coiled spring means.

3. The invention as defined in claim 1 and said antideflection means comprising metallic sleeve means mounted circumjacent said coil spring means.

4. The invention as defined in claim 3 and said sleeve means being fixedly connected to said coil spring means.

5. The invention as defined in claim 4 and said sleeve means being fixedly connected to said coil spring means only at the ends thereof and the coils between the ends of said sleeve means being free and having a limited movement within said sleeve means.

6. The invention as defined in claim 1 and additional means fixing one end of said coil spring means to the journal end portion circumjacent thereto and grippingly engaged thereby.

releasable The invention as defined in claim 6 and the other end of said coil spring means being releasable relative to the roll portion circumjacent thereto and grippingly engaged thereby, said roll end portion being removable from said other end upon release thereof.

8. The invention as defined in claim 7 and having means at the other end of said coil spring means to load and release said coil spring means from said roll end portion.